(12) United States Patent
Maass (10) Patent No.: US 9,576,483 B2
(45) Date of Patent: Feb. 21, 2017

(54) LANE CHANGE ASSISTANT FOR OPTIMIZING THE TRAFFIC FLOW (TRAFFIC FLOW ASSISTANT)

(71) Applicant: Robert Bosch GmbH, Stuttgart (DE)

(72) Inventor: Alexander Maass, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/420,037

(22) PCT Filed: Aug. 1, 2013

(86) PCT No.: PCT/EP2013/066177
§ 371 (c)(1),
(2) Date: Feb. 6, 2015

(87) PCT Pub. No.: WO2014/029598
PCT Pub. Date: Feb. 27, 2014

(65) Prior Publication Data
US 2015/0194055 A1    Jul. 9, 2015

(30) Foreign Application Priority Data
Aug. 23, 2012  (DE) .................. 10 2012 214 979

(51) Int. Cl.
*G08G 1/09* (2006.01)
*G08G 1/01* (2006.01)
(Continued)

(52) U.S. Cl.
CPC ............ *G08G 1/0145* (2013.01); *B60W 30/16* (2013.01); *B60W 30/18163* (2013.01);
(Continued)

(58) Field of Classification Search
CPC ............ B60W 30/16; G08G 1/096708; G08G 1/096716
(Continued)

(56) References Cited

U.S. PATENT DOCUMENTS 7,363,140 B2 * 4/2008 Ewerhart .............. B60W 30/16
                                                       701/96
7,471,212 B2 * 12/2008 Krautter ........... G08G 1/096716
                                                       340/933

FOREIGN PATENT DOCUMENTS

DE       43 13 568       6/1994
DE      100 29 816       1/2002
(Continued)

OTHER PUBLICATIONS

International Search Report for PCT/EP2013/066177, dated Oct. 28, 2013.

*Primary Examiner* — John A Tweel, Jr.
(74) *Attorney, Agent, or Firm* — Gerard Messina (57) ABSTRACT

A device for a traffic flow assistant for a vehicle includes a surroundings sensor system, which recognizes traffic-relevant objects on a traffic lane, on which the vehicle is traveling, and on at least one further adjacent lane, gaps in the traffic are recognized with the aid of the surroundings sensor system and vehicle-dynamic parameters of the objects are determined and future gaps in the flow of traffic are able to be predicted therefrom. For these recognized gaps and predicted gaps, lane change options are ascertained and, from this and the present and/or predicted presence of gaps in the traffic suitable for changing lanes and the vehicle-dynamic state of the vehicle, a signal for the lane selection is generated, which is dependent on the lane change options and an optimization strategy.

11 Claims, 3 Drawing Sheets (51) Int. Cl.
  *B60W 30/16* (2012.01)
  *G08G 1/0967* (2006.01)
  *B60W 50/14* (2012.01)
  *B60W 30/18* (2012.01)
  *G08G 1/0962* (2006.01)

(52) U.S. Cl.
  CPC ........... *B60W 50/14* (2013.01); *G08G 1/0133* (2013.01); *G08G 1/09626* (2013.01); *G08G 1/096708* (2013.01); *G08G 1/096716* (2013.01); *B60W 2520/10* (2013.01); *B60W 2550/22* (2013.01); *B60W 2550/30* (2013.01); *B60W 2550/302* (2013.01); *B60W 2550/306* (2013.01); *B60W 2550/308* (2013.01)

(58) Field of Classification Search
  USPC ..... 340/905, 933, 934; 701/23, 96, 118, 301
  See application file for complete search history.

(56) References Cited

FOREIGN PATENT DOCUMENTS

| | | |
|---|---|---|
| DE | 101 01 651 | 7/2002 |
| DE | 103 21 412 | 12/2004 |
| DE | 103 36 590 | 2/2005 |
| DE | 10 2005 012269 | 9/2006 |
| DE | 100 12 737 | 9/2006 |
| DE | 10 2005 036714 | 2/2007 |
| DE | 10 2007 007 507 | 8/2008 |
| EP | 1 607 264 | 12/2005 |
| EP | 1 877 540 | 2/2008 |

\* cited by examiner

LANE CHANGE ASSISTANT FOR OPTIMIZING THE TRAFFIC FLOW (TRAFFIC FLOW ASSISTANT)

BACKGROUND OF THE INVENTION

1. Field of the Invention

The present invention relates to a device and a method for a traffic flow assistant for a vehicle, including a surroundings sensor system which recognizes traffic-relevant objects on a traffic lane on which the vehicle is traveling and on at least one further adjacent lane, gaps in the traffic being recognized with the aid of the surroundings sensor system and vehicle-dynamic parameters of the objects being determined and future gaps in the flow of traffic being able to be predicted therefrom. For these recognized gaps and predicted gaps, lane change options are ascertained and, from this and the present and/or predicted presence of gaps in the traffic suitable for changing lanes and the vehicle-dynamic state of the vehicle, a signal for the lane selection is generated, which is dependent on the lane change options and an optimization strategy.

2. Description of the Related Art

Many drivers of vehicles find it difficult to select a favorable point in time for changing lanes on multilane roadways. In particular changing from the right lane into the faster traffic of the left lane is considered to be hazardous, since inexperienced drivers often find it difficult to estimate relative speeds in relation to other vehicles, i.e., to predict how rapidly another vehicle is approaching. A person is generally only capable of this by observing how rapidly another vehicle becomes "larger." For rearward vehicles, however, this means a longer look in the mirror, which may distract from the driving situation ahead of the host vehicle.

However, sensors such as radar systems or video systems are capable of measuring the relative speed of an object rapidly and precisely, in addition to the distance.

Systems which relate to a simple lane change assistant are already known and relate to a warning system, which warns in case of a recognized hazard situation. In particular, they warn if the driver intends a driving maneuver which creates a hazardous situation.

Published German patent document DE 43 13 568 C1 describes a system for measuring and determining gaps which allow a traffic lane change. It also considers driving speed changes of the host vehicle, to achieve these gaps. However, the method is only initiated when the driver manually operates a travel direction change indicator lever (turn signal). In addition, if the look-ahead monitoring establishes a slower object ahead of the vehicle, a request to operate this travel direction change indicator lever may take place.

Published German patent application document DE 10 2007 007 507 A1 also describes a "gap warning device," which determines when a gap is free on the adjacent lane to communicate this to the driver. He/she is optionally also given driving instructions (braking, accelerating, waiting until after the next vehicle). For this purpose, the speeds and acceleration or deceleration possibilities are considered. However, the accelerations of the other vehicles are not ascertained, but rather only a history of one's own acceleration behavior is used to obtain suggestions for the acceleration capability. Driving suggestions are only to be output with the aid of a dialogue unit if the behavior of the driver indicates such a lane change intention.

However, a system which outputs autonomous lane change recommendations, which are not necessarily in conjunction with a driver intention, is not known.

BRIEF SUMMARY OF THE INVENTION

This object is achieved by a device and a method according to the species of the independent claims for outputting a signal which represents a lane change recommendation.

The core of the present invention relates to a traffic flow assistant for a vehicle which contains a surroundings sensor system, which recognizes traffic-relevant objects on a traffic lane on which the vehicle is traveling.

The term "traffic-relevant objects" are to be understood within the scope of the present invention as other road users (in particular motor vehicles, possibly also stationary objects), which will have or already have an influence on the driving or traffic behavior of the host vehicle, since the driver of the host vehicle reacts thereto or must react thereto in the future.

This recognition of traffic-relevant objects is advantageously also carried out for at least one adjacent traffic lane, since the knowledge of the instantaneous traffic situation on the adjacent traffic lane is necessary for a lane change assistant. The surroundings sensor system may advantageously be designed in such a way that it may detect all relevant traffic lanes which may be traveled by the vehicle and it recognizes possibly present objects. These are generally all traffic lanes having the same travel direction as the traffic lane in which the host vehicle travels.

The surroundings sensor system may advantageously be designed in such a way that the traffic on the lanes may be detected forward (ahead), or to the rear, i.e., the rearward traffic. It is particularly advantageous if both directions are detected to obtain a complete image of the surrounding traffic-relevant objects (for example, obstructions ahead and approaching vehicles from the rear). This may advantageously be carried out by various types of surroundings sensor systems, for example, with the aid of a radar system, which detects the traffic in the form of the traffic-relevant objects ahead of the host vehicle and a rearview camera, which detects the rearward traffic. Corresponding to one refinement of the present invention, the lateral areas of the host vehicle on the adjacent traffic lane may be detected and objects on the adjacent traffic lane which move "at the same level," i.e., have approximately the same longitudinal position, are detected.

In general, such a surroundings sensor system may include sensors in the host vehicle, which perceive the surroundings situation and may be used and analyzed independently of vehicle-external positions. Primarily, video-based systems (cameras) may be used here as sensors, or also radar systems, ultrasonic systems, or lidar systems.

However, it is also conceivable that the surroundings sensor system ascertains the desired parameters of the traffic-relevant objects with the aid of vehicle-external sensors, and/or external information sources, in that the external sensor system and the external information sources are not situated in the host vehicle, but the signals thereof are generally transmitted via data links from external positions or vehicles to the vehicle, in particular using car-to-car communication (C2C or C2X). Thus, the location and the vehicle-dynamic parameters of other traffic-relevant objects may be ascertained by these objects themselves and communicated to the host vehicle.

The surroundings sensor system typically ascertains the position of the traffic-relevant objects on the various traffic lanes, whereby it is possible to recognize gaps in the traffic flow. A gap exists when the distance between two traffic-relevant objects is sufficiently large that the host vehicle has space in between, possibly taking into consideration a safety distance. A gap in the traffic literally means the same thing, since traffic means here the targeted movement of the traffic-relevant objects, the road users.

Furthermore, the surroundings sensor system is capable of determining vehicle-dynamic parameters of the objects, which include in particular the absolute speeds, the relative speed in relation to the host vehicle, accelerations, distances of the objects to the vehicle, and the distances between these objects. Furthermore, it is possible that the surroundings sensor system may also carry out an object recognition, which establishes, for example, a classification of the road user or the type of the road user. From these parameters, when they are provided for a sufficient number of objects, using certain model assumptions and with the aid of the properties of the object classes, it may be determined which gaps in the traffic will arise in the future, will become larger, or which gaps will become smaller and possibly disappear entirely. A mathematical model may be used with the aid of probabilities, for example.

Gaps in the traffic may be predicted on the basis of these vehicle-dynamic parameters of the objects. With the aid of this prediction, optionally alternatively or additionally taking into consideration the presently existing gaps, together with the vehicle-dynamic state of the host vehicle, a certain number of options for the lane change of the host vehicle may be ascertained. The option of maintaining one's own lane is also considered in this case.

On the basis of these ascertained options for changing lanes, a signal is output to the driver, which recommends a traffic lane to the driver and determines a possible lane selection required for this purpose, this lane selection proposal being generated on the basis of an optimization strategy.

This signal, which specifies a lane selection, may include a recommendation for a one-time or single lane change, or also a plurality of lane changes, which enable "snaking through" the traffic in a sequential sequence. This plurality of lane selection recommendations may also be referred to as a so-called planned setpoint trajectory or setpoint travel path, these items of information optionally also being supplied to other driver assistance systems (such as a lane keeping system).

The device according to the present invention and the method according to the present invention have the advantage of optimizing the traffic flow. This may be used for a shorter travel time, i.e., more rapid progress, lower fuel consumption, or increased driving safety.

In addition to the vehicle-dynamic parameters (also referred to as states), the vehicle-dynamic capabilities of the host vehicle and/or of the traffic-relevant objects may be used to determine the options for the lane change. Thus, it may be taken into consideration from the classification of the type of the object which evasive options or accelerations or deceleration options the host vehicle or another vehicle has, since these may have effects on the gap formation. The acceleration capability of a truck is thus to be assumed to be rather low, that of a sports car rather high, and the evasive behavior of a vehicle to be less flexible than that of a two-wheeler, which may carry out faster direction changes and lateral accelerations. An above-mentioned object recognition may be used for this purpose, which ascertains the vehicle type, for example, and ascertains the technical parameters, in particular the capabilities of the particular vehicle, from a database. A suitable model for the predictive gap determination takes into consideration these capabilities, for example, by estimating how high the probability is that a traffic-relevant object utilizes these capabilities ascribed to the object and optionally to which degree it utilizes them and therefore has influence on the occurrence of gaps. Thus, for example, it may be presumed that a sportily moving vehicle, which may be recognized based on its longitudinal acceleration, will use an existing gap, while in contrast a sluggish vehicle is less likely to. This may be carried out via an intermediate step of the prediction of the vehicle-dynamic parameters of these objects, by estimating the future possible vehicle-dynamic parameters of this object while knowing the vehicle-dynamic capabilities of an object and in turn predicting the variety of possible gaps based on this estimation.

Various strategies will be described hereafter, of how the optimization strategy according to the present invention may be carried out and from which the driver may select the one instantaneously suitable for him/her.

One optimization strategy may be to enable a preferably rapid progress in traffic, so that the attempt is made to achieve a higher average speed by a preferably skillful gap utilization and therefore to reduce the travel time.

Another possibility for an optimization strategy for the traffic flow assistant is to reduce the number of the lane changes, so that lateral accelerations of the occupants are preferably avoided or are at least preferably kept low, which the passengers perceive as an increase of the driving comfort and the safety, since lane changes are always also accompanied by a safety risk.

Another possible optimization strategy is to maintain and regulate preferably large safety distances ahead of the host vehicle to the preceding objects, which is used to increase the driving safety. If multiple safety distances to various objects are relevant, as a function of a hazard potential, a greater distance may be selected to the object which creates a potentially higher hazard for the host vehicle due to its driving behavior.

Furthermore, it is possible to design the optimization strategy in such a way that a preferably low energy and fuel consumption are caused. This reduces the operating costs of the relevant vehicle and promotes environmental protection and lengthens the service life of some technical components of the vehicle.

Furthermore, the optimization strategy may advantageously be designed in such a way that a preferably slight acceleration or a preferably uniform acceleration or an acceleration which is uniformly distributed over time is preferably caused. This is perceived by the occupants as particularly passenger-friendly travel and is used for a comfortable driving experience. Furthermore, it is also possible to select the speed difference between the vehicle and the other, recognized traffic-relevant objects in such a way that the speed differences between them are kept as small as possible, which also provides a comfortable travel feeling to the occupants, since approaches to other vehicles are avoided and one's own driving is perceived as going with the flow of traffic.

Furthermore, it is advantageous if the optimization strategy is selected in such a way that a preferably little hazard arises or a hazard potential ascertained by the system is minimized. Possible and meaningful lane selection recommendations may thus be suppressed, by which other road users could be endangered or which could cause the road users to have a hazardous reaction. To implement this strategy, it is possible to ascertain a probability which describes such a reaction of another road user and suppresses a lane selection recommendation as a function of a threshold value.

The optimization strategy may advantageously exert an early signal effect on other objects, in that in cases in which multiple options for the lane selection recommendation are present, the one which informs other road users early about which path the host vehicle will take is selected and prepare them for this maneuver. Thus, for example, a lane change may be carried out as early as possible, or instead may only be implemented at a later point in time, after a suitable turn signal phase.

The selection of one or optionally multiple ones of these strategies may be carried out in various ways. For example, this selection may be carried out by a manual input on the part of the driver, i.e., the driver directly selects the desired strategy or the desired strategies having the corresponding prioritization of the strategies. Furthermore, it is alternatively possible that a matching strategy is provided to the driver or multiple strategies having the corresponding prioritizations are provided, in that the earlier driving behavior is analyzed, for example, whether changes are frequently made between acceleration and deceleration, whether strong acceleration was carried out, whether strong deceleration was carried out, whether frequent steering was carried out, and/or whether large steering angle deflections were used. A suitable optimization strategy or a suitable combination of optimization strategies is thereupon offered to the driver and the driver may confirm it or it is alternatively conceivable that this strategy is implemented without driver confirmation.

Furthermore, it is advantageous if surroundings conditions have an influence on the strategy or the prioritization of multiple strategies. It is thus conceivable that if a poor road surface condition is recognized, an optimization strategy is selected which enables slow progress, and at the same time large distances are maintained to the preceding vehicle, so that the driver has the possibility of perceiving the road surface condition early, without the preceding vehicle concealing the timely view of the road surface from him. Weather conditions may also be detected and a defensive style of driving may be selected in bad weather. Furthermore, it is conceivable that the traffic density is detected and taken into consideration, for example, by selecting a defensive optimization strategy in the event of an accident-prone traffic density. The style of driving of the other road users may also be taken into consideration; if they predominantly drive in a sporty and highly dynamic way, frequent and rapid lane changes are thus provided.

It is conceivable that not only one single optimization strategy is applied, but rather multiple strategies are used at the same time, which are prioritized at different strengths, however, so that their respective instantaneous influence on the output of the lane change recommendation is different. On the basis of the surroundings sensor signals, situations may be detected and processed in a computational model, the described strategies being applied to generate an optimization strategy using the above-mentioned options, which then outputs or implements special lane selection recommendations. This computational model may be implemented using known mathematical methods, for example, neuronal networks or fuzzy logic.

Furthermore, it is advantageous if items of information of other internal vehicle systems are taken into consideration, so that, for example, an energy-saving style of driving is selected if the energy or fuel reserve is low, so that in this way the remaining range is increased.

The degree of the effects of the optimization strategy on the driving surroundings may advantageously be set. Thus, the optimization strategy may be designed in such a way that only the host vehicle profits from this style of driving and less consideration is optionally taken of other road users. This may be advantageous if no information exchange with vehicle systems of other road users is possible, so that an optimum may not be reached for multiple road users, or if the requirements of the driver of the host vehicle are given a higher priority in one's own judgment than those of the other road users. However, the traffic rules and regulations should be taken into consideration in this case. Alternatively, the optimization strategy may be used for the purpose of offering one of the described advantages (rapid progress, safety, fuel saving) for other traffic-relevant objects, for example, in that the host vehicle makes space for other vehicles which want to pass or merge, or in that the host vehicle is accelerated so as not to hold up someone traveling behind. If multiple traffic-relevant objects in the form of road users are present, certain road users may be prioritized or an attempt is made to determine an optimum means, which satisfies as many of them as possible.

It may advantageously also be prioritized whom the strategy to be selected is to assist most, in particular in that it is specified how much the strategy is to distribute the advantages between other road users and the host vehicle.

The signal for the lane selection may advantageously be output in various ways. Thus, in one case the driver may receive a lane selection recommendation, which is communicated to him/her acoustically or visually, for example. This recommendation should differ from warnings of other driver assistance systems, so that the driver may readily and intuitively absorb the recommendation. Furthermore, if a serious hazard to the vehicle should arise, this is signaled more clearly to the driver than the lane selection recommendation.

Alternatively, the lane selection recommendation may also be relayed to a steering actuator system, so that a driving maneuver is initiated automatically without further action of the driver. This occurrence relieves the driver from driving decisions and driving tasks, in that the vehicle automatically selects the traffic lane most suitable for the particular selected optimization strategy and automatically maintains it or changes thereto. Furthermore, it is possible that the driver confirms a suggested lane change maneuver and, after completed driver confirmation, this driving maneuver is automatically implemented without further action of the driver. To leave the responsibility at all times with the driver, it is furthermore possible that a steering torque is applied via a lane keeping system (LKS), which steers the vehicle according to the recommendation without driver action and against which the driver may apply a steering force at any time so as not to follow the recommendation, but rather to implement other types of steering actions. This variant has the advantage that it is particularly intuitive. In addition to the steering intervention, it is possible that the speed of the vehicle is adapted by acceleration or deceleration to the flow of traffic or according to the selected optimization strategy.

Another advantageous refinement of the present invention provides that, in addition, a lane evaluation is carried out of one's own or the adjacent traffic lanes, which is independent of the present traffic volume and specifies how good the particular traffic lane is for a possible strategy. Thus, for a strategy of increased driving safety, it may be detected whether it is better within the scope of driving safety to use one or another traffic lane. On the one hand, for a strategy of increased driving comfort, it may be detected whether it is better within the scope of driving comfort to use one or another traffic lane. Within the scope of driving safety, the geometry and condition of the particular traffic lanes may advantageously be ascertained and compared. Thus, for example, a wide traffic lane offers greater safety than a narrow one; on the other hand, the ground condition or the quality of the road surface may influence the safety, so that a right traffic lane on a freeway offers a higher safety due to the greater width, but this safety reserve is negatively influenced because of the worse road surface. A corresponding estimation for the traffic lane is to be carried out here, since some traffic lanes are more advantageous for a desired strategy than others. This goes beyond a gap recognition and fundamentally has nothing to do with other vehicles which are present. Thus, for example, a possibility for the lane selection may be selected on the basis of this lane evaluation, which corresponds to a more probable success according to the desired strategy.

It may also be taken into consideration that there may be traffic lanes on which it is more probable that a road user will change his/her speed than on others. This is the case, for example, in traffic lanes which include a turnoff lane at the same time. Therefore, there is a higher probability that a preceding vehicle on such a lane having a turnoff possibility will brake, since it possibly will turn off, than a vehicle which travels on the adjacent traffic lane without this turnoff possibility.

Furthermore, it is meaningful to detect imminent lane ends, lane merges, or lane expansions, since these situations have effects on how suitable one or another traffic lane is to implement a particular optimization strategy. For example, if a traffic lane expansion is imminent on the right lane, it may thus be advantageous to remain on this traffic lane although a slower vehicle is traveling ahead, since it may be presumed that the preceding vehicle will swerve to the right and therefore release the newly arising traffic lane.

Vice versa, a lane merge of the leftmost traffic lane may have the result that the traffic tends to jam up thereon, whereby the selection of a right traffic lane is presumably more suitable.

Furthermore, it is advantageous that in the preparation of an optimization strategy for the traffic flow assistant, the applicable regulations, in particular the particular traffic rules, are complied with and lane selection recommendations are ascertained, which, when they are implemented, allow the regulations to be complied with. This also applies for the compliance with safety distances, and the compliance with the speed limit. The optimization strategy is advantageously designed in such a way that these regulations are not violated, except in driving situations having hazardous situations, in which violating regulations is allowed to avoid accidents.

Exemplary embodiments of the present invention are illustrated in the drawings and explained in greater detail in the following description.

DETAILED DESCRIPTION OF THE INVENTION

The host vehicle is referred to as the "ego vehicle" and all other vehicles are referred to as "external vehicles" in the figures.

Figure 1:
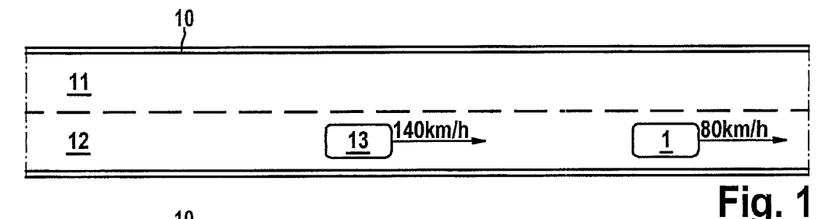
FIGS. 1 through 14 show various driving situations illustrating how a lane selection assistant or traffic flow assistant assists the driver in the respective driving situations.

FIG. 1 shows a road 10 having multiple traffic lanes 11, 12, on which vehicles travel. Ego vehicle 13, which is equipped with the traffic flow assistant according to the present invention, approaches a significantly slower external vehicle 1. The traffic flow assistant may assist here in that it recommends a lane change, for example, 10 seconds before the ego vehicle would overtake external vehicle 1 at unchanged speed. Therefore, the driver does not change excessively early or excessively late into the passing lane. If there is only a slight speed difference between ego vehicle 13 and external vehicle 1, in contrast (for example, <5 km/h), the traffic flow assistant could recommend remaining in present lane 12.

Figure 2:
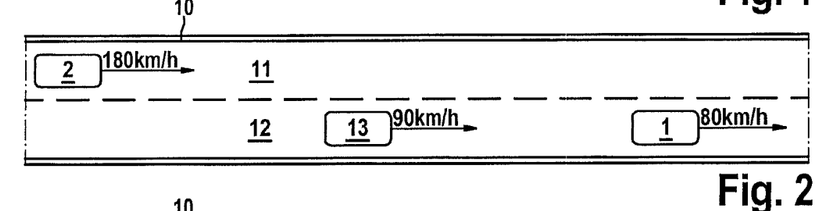

In FIG. 2, ego vehicle 13 approaches a somewhat slower external vehicle 1. If ego vehicle 13 would now change from lane 12 to adjacent lane 11, however, a hazard would occur due to significantly faster external vehicle 2. The decision according to the optimization strategy is to wait a short time for the lane change here until significantly faster external vehicle 2 has passed ego vehicle 13. The traffic flow assistant would thus first recommend "remain in present lane 12" and immediately recommend "change lane" after external vehicle 2 has passed.

Figure 3:
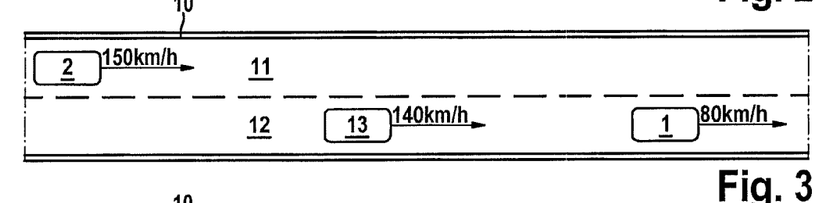

In FIG. 3, ego vehicle 13 approaches on lane 12 toward a significantly slower external vehicle 1, which also travels on lane 12, while an only slightly faster external vehicle 2 approaches from the rear on passing lane 11. The optimal decision here is to begin the lane change immediately, so that external vehicle 2 may decelerate early.

Figure 4:
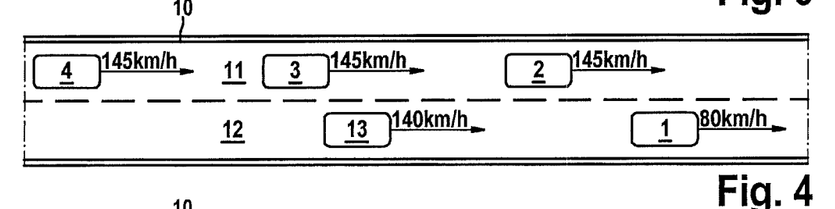

In FIG. 4, ego vehicle 13 approaches a significantly slower external vehicle 1 in traffic lane 12, while only slightly faster external vehicles 2, 3, 4 travel in passing lane 11. Since ego vehicle 13 would collide with external vehicle 3 in the event of an immediate lane change, the traffic flow assistant recommends "remain in the present lane."

Figure 5:
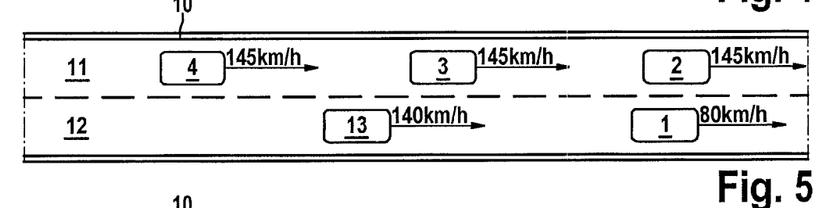

As soon as the situation in FIG. 5 results, however, the assistant recommends "lane change to the left."

Figure 6:
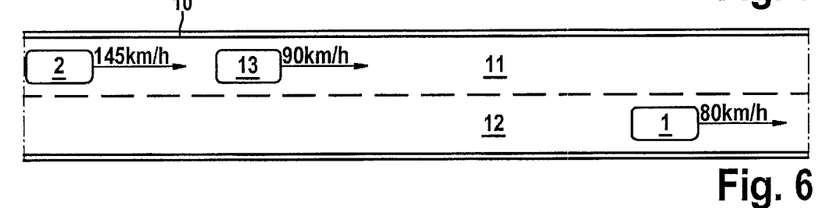

In FIG. 6, ego vehicle 13 is located on passing lane 11 and approaches a slightly slower external vehicle 1 on traffic lane 12, while a significantly faster external vehicle 2 approaches from the rear. In this situation, the traffic flow assistant calculates a maneuver, according to which external vehicle 2 may pass ego vehicle 13 significantly before the ego vehicle reaches external vehicle 1, and recommends an immediate "lane change to the right" to traffic lane 12 and a subsequent "lane change to the left," after ego vehicle 13 has been passed by faster external vehicle 2 on traffic lane 11.

Figure 7:
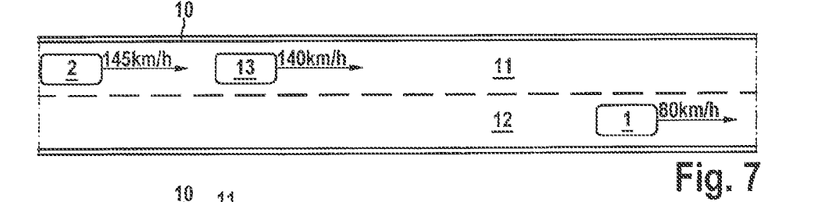

In FIG. 7, in contrast, ego vehicle 13, at an approximately equal speed as external vehicle 2 traveling behind on the same traffic lane 11, will pass external vehicle 1 in a few seconds and external vehicle 2 coming from the rear is only slightly faster than ego vehicle 13. The traffic flow assistant therefore recommends in this situation "remain in present lane 11." The traffic flow assistant may therefore also assist an uncertain driver in ego vehicle 13 in the event of aggressive tailgating of external vehicle 2.

Figure 8:
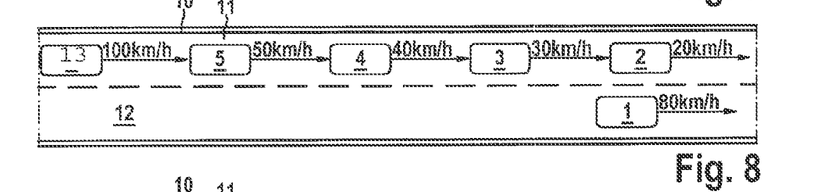

FIG. 8 shows as an example that external vehicles 2 through 5 are traveling ahead and decelerating in the same traffic lane 11 on which ego vehicle 13 is presently traveling. Thus, external vehicle 2 has already reached 20 km/h, for example, and it is to be predicted that external vehicles 3 through 5 in the same lane will shortly also decelerate to a speed of approximately 20 km/h. In contrast, the traffic flows significantly faster in right traffic lane 12. In this situation, the traffic flow assistant recommends according to the optimization strategy that a "lane change to the right" to traffic lane 12 should be carried out, however, only if an external vehicle is not traveling directly to the right adjacent to ego vehicle 13.

Figure 9:
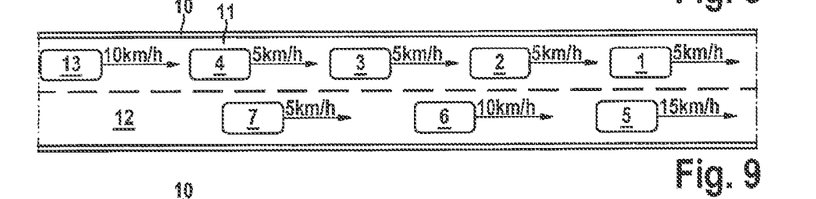

FIG. 9 shows a driving situation, according to which, from the viewpoint of ego vehicle 13, both traffic lanes 11 and 12 appear equally slow-moving at first glance. However, external vehicles 5 and 6 are already traveling faster in right traffic lane 12 than adjacent external vehicles 1, 2, and 3 on adjacent traffic lane 11, so that right lane 12 is the traffic lane on which one may progress more rapidly. The lane selection assistant therefore recommends "lane change to the right." Even at equal speeds of all external vehicles 1 through 7 on left and right traffic lanes 11, 12, the right lane would be advantageous, since fewer vehicles are underway on right lane 12 and they maintain greater distances to one another and it is therefore foreseeable that ego vehicle 13 will progress more rapidly on right lane 12.

Figure 10:
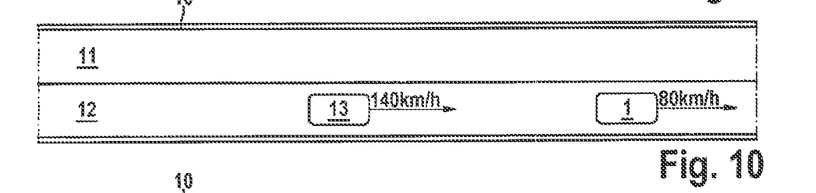

In the driving situation shown in FIG. 10, a lane change of ego vehicle 13 would be advantageous, so that braking would not have to be performed before slower external vehicle 1, but the lane change is forbidden because of the solid line between traffic lanes 11 and 12. The lane selection assistant therefore does not recommend a lane change.

Figure 11:
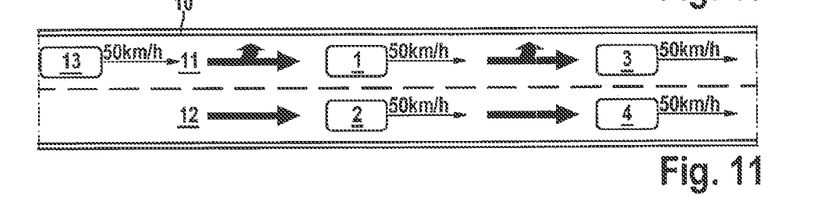

The situations shown up to this point show examples in which a lane change decision may be made relatively unambiguously. In addition to these unambiguous criteria, additional criteria may be used, as shown in the following figures:

In FIG. 11, both traffic lanes 11 and 12 appear equally heavily utilized by road users 1, 2, 3, 4, if one exclusively observes external vehicles 1 through 4. However, the arrows on traffic lanes 11, 12 signal that the risk exists in left lane 11 that one of external vehicles 1 or 3 will brake soon to turn off to the left, as indicated by the directional arrow on the traffic lane. In this driving situation, right lane 12 is thus more advantageous, so that the lane selection assistant will recommend a lane change to the right.

Figure 12:
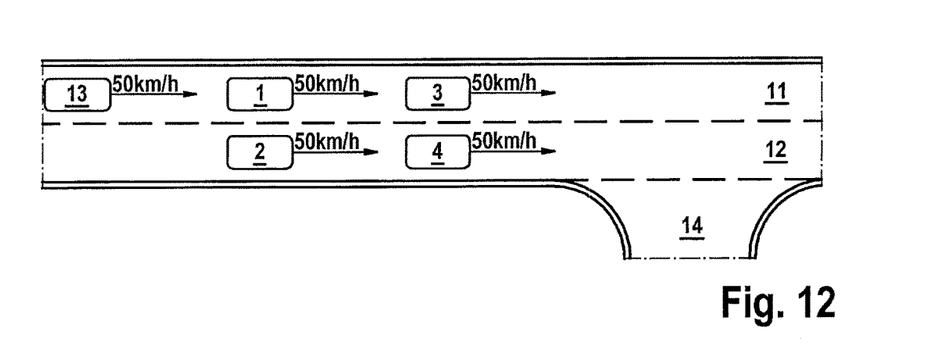

In the driving situation shown in FIG. 12, both traffic lanes 11 and 12 again appear equivalent with respect to the driving speed to be expected if one exclusively observes external vehicles 1 through 4. However, the hazard exists in right lane 12 that one of external vehicles 2 or 4 will brake soon to turn off to the right into side street 14, or because an external vehicle (not shown) will enter from side street 14 and external vehicles 2 and 4 will have to brake so as not to collide. From this situation, the optimization strategy in this driving situation would prefer left traffic lane 11 and would recommend that the driver continue to use traffic lane 11.

Similarly, the lane selection recommendation may prefer a traffic lane, for example, which expands to two lanes further ahead, or advise against a traffic lane into which a further traffic lane merges further ahead.

Figure 13:
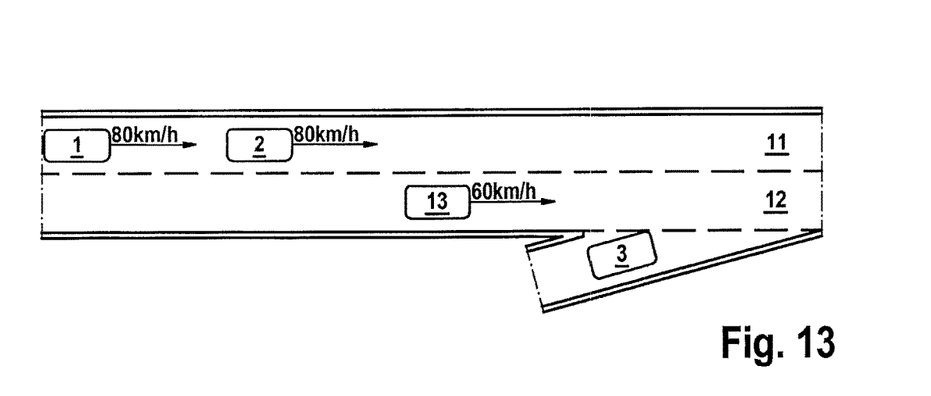

The traffic flow assistant may also take into consideration an overall economic optimum in the decision finding. For example, it is difficult to estimate in the situation of FIG. 13 whether ego vehicle 13 should change to the left into traffic lane 11 or not and should continue on traffic lane 12. The lane change to the left onto traffic lane 11 would enable the waiting external vehicle to merge with an exemplary time advantage of approximately 5 seconds, for example, but at the same time, however, external vehicles 1 and 2 and possible further following vehicles would be forced to brake, so that a time disadvantage of 3 seconds each would result for each affected road user, for example. In such situations, the lane change assistant could add up the time loss of external vehicles 1 through 3 for both decision options (lane change yes or no) and recommend the option having the smaller total of time disadvantages. Alternatively, the lane change assistant could recommend the option having the most favorable total fuel consumption. For example, without a lane change, external vehicle 3 could consume 0.01 L more fuel due to the longer wait, but with a lane change recommendation, external vehicles 1 and 2 could each consume 0.02 L more fuel due to the braking and the later re-acceleration. It would then be more economically favorable overall to not output a lane change recommendation. However, it could just as well be economically more favorable overall to output a lane change if many further vehicles are waiting behind external vehicle 3 or if, a few meters further ahead, a speed limit will force external vehicles 1 and 2 to decelerate in any case, since then the disadvantage in fuel consumption for external vehicles 1 and 2 is therefore also canceled out.

Figure 14:
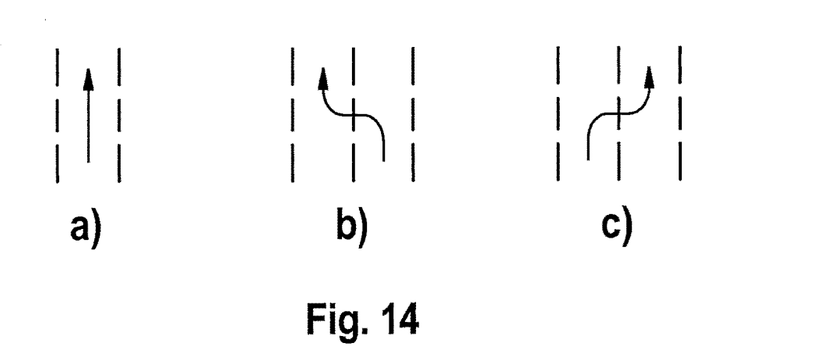

FIG. 14 shows how a possible visualization of the lane selection recommendation in the instrument cluster of ego vehicle 13 could appear. FIG. 14a shows an example of a recommendation "remain in the present traffic lane," FIG. 14b shows an example of how a recommendation "lane change to the left" could be displayed, and FIG. 14c shows an example of how a recommendation "lane change to the right" may be displayed. A multistage display is also conceivable, in that, for example, in the case of a recommended change into an advantageous traffic lane, the visualization of the lane selection recommendation is displayed in green or blue, but in case of a hazard, the visualization of the lane change recommendation is displayed in red or yellow and additionally or alternatively by flashing.

What is claimed is:

1. A traffic flow assistant for a vehicle, comprising:
   a surroundings sensor system configured to: (i) recognize traffic-relevant objects on a traffic lane on which the vehicle is traveling and on at least one adjacent lane, and (ii) recognize specific presently existing gaps in the traffic surrounding the vehicle and determine vehicle-dynamic parameters of the objects, wherein specific future gaps in the traffic are predicted based on the vehicle-dynamic parameters; and
   a control unit configured to: (a) ascertain options for changing lanes, depending on the vehicle-dynamic state of the vehicle and at least one of: i) the specific presently existing gaps in the traffic suitable for changing lanes, and ii) the predicted presence of specific future gaps in the traffic suitable for changing lanes, and (b) generate a signal for the lane selection, depending on the ascertained options for the lane change and a predefined optimization strategy;
   wherein, on the basis of the signal, one of: a lane selection is suggested to the driver autonomously; or a driving maneuver is automatically initiated without action of the driver.

2. The traffic flow assistant as recited in claim 1, wherein vehicle-dynamic capabilities of at least one of the host vehicle and the traffic-relevant objects are also taken into consideration to ascertain the options for changing lanes.

3. The traffic flow assistant as recited in claim 2, wherein the optimization strategy includes at least one of:
   a strategy of rapid progress;
   a strategy of minimizing lane changes;
   a strategy of achieving predefined safety distances of the vehicle from the other objects;
   a strategy of one of a predefined energy consumption rate or a predefined fuel consumption rate;

a strategy of one of a predefined acceleration or a predefined difference between the vehicle and at least one object;

a strategy of minimizing one of a hazard or hazard potential; and a strategy of an early signaling to the other objects.

4. The traffic flow assistant as recited in claim 3, wherein the strategy is determined by one of: manual input; surroundings conditions; prioritization; or vehicle-dynamic capabilities of the vehicle.

5. The traffic flow assistant as recited in claim 3, wherein the optimization strategy is oriented at least one of: to the host vehicle; and to all traffic-relevant objects.

6. The traffic flow assistant as recited in claim 2, wherein the signal for the lane selection is generated by additionally taking into account a lane evaluation of at least one of the vehicle's present lane and the at least one adjacent traffic lane.

7. The traffic flow assistant as recited in claim 6, wherein the lane evaluation is dependent on at least one of: a present geometry of the traffic lanes; upcoming geometry of the traffic lanes; ground condition of the traffic lanes; a reason for a driving speed change; a lane end; and a lane expansion.

8. The traffic flow assistant as recited in claim 2, wherein traffic regulations are also taken into consideration in generating the lane selection signal.

9. A method for optimizing a traffic flow for a vehicle, comprising:

ascertaining traffic-relevant objects on a traffic lane on which the vehicle is traveling and on at least one adjacent lane;

ascertaining specific presently existing gaps in the traffic surrounding the vehicle and determining vehicle-dynamic parameters of the objects, wherein specific future gaps in the traffic are predicted based on the vehicle-dynamic parameters;

ascertaining options for changing lanes, depending on the vehicle-dynamic state of the vehicle and at least one of: i) the specific presently existing gaps in the traffic suitable for changing lanes, and ii) the predicted presence of specific future gaps suitable for changing lanes in the traffic; and generating a signal for the lane selection, depending on the ascertained options for the lane change and a predefined optimization strategy;

wherein, on the basis of the signal, one of: the lane selection is suggested to the driver autonomously; or a driving maneuver is automatically initiated without action of the driver.

10. The traffic flow assistant as recited in claim 1, wherein the specific presently existing gaps in traffic and the specific future gaps in traffic are suitable for changing lanes when a distance between two traffic-relevant objects is sufficiently large that the vehicle can fit therebetween.

11. The traffic flow assistant as recited in claim 9, wherein the specific presently existing gaps in traffic and the specific future gaps in traffic are suitable for changing lanes when a distance between two traffic-relevant objects is sufficiently large that the vehicle can fit therebetween.

* * * * *